United States Patent
Manohararajah et al.

(10) Patent No.: US 7,412,677 B1
(45) Date of Patent: Aug. 12, 2008

(54) DETECTING REDUCIBLE REGISTERS

(75) Inventors: Valavan Manohararajah, Scarborough (CA); Gordon R. Chiu, Richmond Hill (CA); Deshanand Singh, Mississauga (CA); Stephen Brown, Toronto (CA)

(73) Assignee: Altera Corporation, San Jose, CA (US)

( * ) Notice: Subject to any disclaimer, the term of this patent is extended or adjusted under 35 U.S.C. 154(b) by 309 days.

(21) Appl. No.: 11/360,739

(22) Filed: Feb. 22, 2006

(51) Int. Cl.
*G06F 17/50* (2006.01)
(52) U.S. Cl. .................. 716/5; 716/1; 716/2; 716/4
(58) Field of Classification Search .............. 716/5, 716/4, 2, 1
See application file for complete search history.

(56) References Cited

U.S. PATENT DOCUMENTS

| | | | | |
|---|---|---|---|---|
| 5,343,195 | A * | 8/1994 | Cooper .................. | 341/67 |
| 5,822,217 | A * | 10/1998 | Shenoy .................. | 716/6 |
| 6,336,205 | B1 * | 1/2002 | Kurokawa et al. .......... | 716/2 |

OTHER PUBLICATIONS

Higuchi, Hiroyuki et al.; "An Implication-based Method to Detect Multi-Cycle Paths in Large Sequential Circuits"; 6 pages, DAC, Jun. 2002.

Krohm, Florian et al.; "The Use of Random Simulation in Formal Verification"; 1996, IEEE, pp. 371-376.

Zhang, Jin S. et al.; "Simulation and Satisfiability in Logic Synthesis"; 8 pages, (NSF, 2005).

* cited by examiner

*Primary Examiner*—Sun J Lin
(74) *Attorney, Agent, or Firm*—David B. Raczkowski; Townsend and Townsend and Crew LLP (57) ABSTRACT

Reducible registers are determined to optimize a sequential circuit. A screening method tests one or more sets of registers where the registers of each set are assumed to satisfy a logic condition. The tests determine if the logic condition holds. If the logic condition of a set is found to be violated, the registers may be moved to another set having a different logic condition or removed completely. The registers remaining are potentially reducible. The reducibility of the registers is verified via Boolean analysis by verifying the logic conditions of a register set for each register. If a register does not pass verification, it then may be moved to a different set having a different logic condition or removed completely. The sets that pass verification are reducible.

30 Claims, 9 Drawing Sheets

FIG. 1  Sequential circuit model.

DETECTING REDUCIBLE REGISTERS

BACKGROUND

The present invention relates to the field of programmable devices, and the systems and methods for programming the same. Programmable devices, such as FPGAs, typically includes thousands of programmable logic cells that use combinations of logic gates and/or look-up tables to perform logic operations. Programmable devices also include a number of functional blocks having specialized logic devices adapted to specific logic operations, such as adders, multiply and accumulate circuits, phase-locked loops, and memory. The logic cells and functional blocks are interconnected with a configurable switching circuit. The configurable switching circuit selectively routes connections between the logic cells and functional blocks. By configuring the combination of logic cells, functional blocks, and the switching circuit, a programmable device can be adapted to perform virtually any type of information processing function.

A typical process for determining the configuration of a programmable device, referred to compilation, starts with an extraction phase, followed by a logic synthesis phase, a fitting phase, and an assembly phase. The extraction phase takes a user design, typically expressed as a netlist in a hardware description language such as Verilog or VHDL, and produces a set of logic gates implementing the user design. In the logic synthesis phase, the set of logic gates is permuted over the hardware architecture of the programmable device in order to match elements of the user design with corresponding portions of the programmable device. The fitting phase assigns the various portions of the user design to specific logic cells and functional blocks (sometimes referred to as placement) and determines the configuration of the configurable switching circuit used to route signals between these logic cells and functional blocks (sometimes referred to as routing), taking care to satisfy the user timing constraints as much as possible. In the assembly phase, a configuration file defining the programmable device configuration implementing the user design is created. The programmable device configuration can then be loaded into a programmable device to implement the user design. Programmable devices can be configured with the configuration during or after manufacturing.

Figure 1:
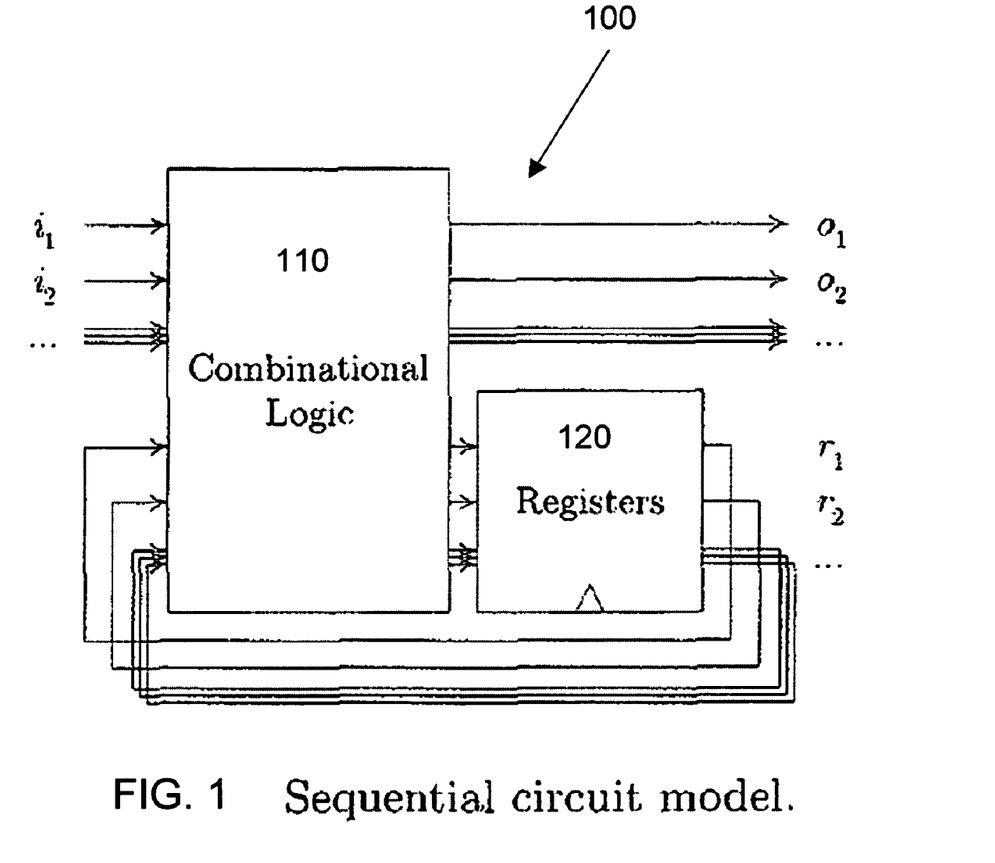
FIG. 1 illustrates an example configuration of a sequential circuit suitable for use with an embodiment of the invention.

One of the substantial challenges of the logic synthesis phase is the optimal representation of the user design of the sequential circuit. FIG. 1 illustrates an example sequential circuit. In a sequential circuit 100, there exists combinational logic 110, such as AND, OR, and other types of gates, and registers 120. Registers store the current state of the sequential circuit 100. The next state of the sequential circuit 100 may depend on the current state and/or on inputs to the circuit. Often, the logic synthesis phase strives to implement portions of the user design with as few registers and combinational logic gates as possible in order to get a more efficient design or implementation. The search for reducible registers is important for this goal of reducing the number of registers and logic elements.

Examples of reducible registers are "stuck-at" or "duplicate" registers. In some circuits, a register value may never change regardless of the inputs or the current state of the sequential circuit, and thus the register is "stuck-at" the value with which it powers up. Other register values are "duplicates," if they are set to identical values at power up and continue to carry identical values for every possible current state and input combination to the sequential circuit. Registers that have opposite values and continue to carry opposite values are also considered "duplicates." Reducible registers and associated logic can be removed to simplify the sequential circuit.

Some optimization methods use Boolean analysis to identify reducible registers. Although robust and accurate, these methods are quite slow when the number of inputs and registers is large. Other methods use random simulation methods to test the functional equivalence of hardware designs. These random simulation methods randomly select input values to test the outputs of different circuits. To verify functional equivalence, the random simulation methods require an exhaustive search of all input values to avoid leaving large portions of a sequential circuit untested. Additionally, these prior "functionally equivalent" approaches are limited to evaluating the equivalence of combinational circuits already identified for optimization. They do not identify possible areas of a circuit to be optimized.

It is therefore desirable to have a fast and efficient system and method to optimize a sequential circuit. It is further desirable for the system and method to quickly screen out registers that are not likely to be reducible. It is also desirable for the system and method to efficiently identify and verify reducible registers given a user specified sequential circuit.

BRIEF SUMMARY

An embodiment of the invention optimizes a sequential circuit. The embodiment receives a sequential circuit, screens a set of registers to identify potentially reducible registers, and verifies whether potentially reducible registers are reducible for all possible input combinations to the circuit.

In an embodiment of the invention, a screening phase starts by initializing one or more register sets. The initialization defines one or more logic condition for a set and populates the set with registers assumed to satisfy the logic condition. After a set is initialized, a test is done on the set's registers to determine if the registers violate a logic condition of the set. If a register violates a logic condition, it may be removed from consideration as a potentially reducible registers or placed into another set having another logic condition. The process of testing and putting registers in new sets may continue until a stopping criteria is met. At times during this repeated process, a register set may be found to not be reducible. When this happens, the register set is removed and the associated registers are not considered further. In this manner, the registers within register sets remaining at the end have a higher likelihood of being reducible.

According to another embodiment, during the screening phase, the test for determining if the registers violate a logic condition is accomplished by running a simulation of the sequential circuit. The simulation uses new input values and current register values to obtain new register values, and then compares a register's new value to the register's current value to determine if there is a violation of a logic condition. The new inputs may be randomly generated or chosen for specific qualities. Additionally, as part of the test, registers that do not belong to a register set may have their current value change in any manner. Registers that do belong to a set may have their current value change in a manner consistent with a logic conditions of that set.

According to another embodiment of the invention, a verification phase starts with initializing a data structure, if needed. The next step verifies if a logic condition assumed for a register set holds for the registers in the set. In one embodiment, the verification is done by performing Boolean analysis on the registers of a set. In another embodiment, a logic condition of a register set may be applied as a constraint on the verification process. If a register does not pass verification, it may be removed from further verification analysis or placed into another set having another logic condition. The process of verifying logic conditions for registers and putting registers in new sets can continue until all logic conditions for all register sets are verified for all registers in the sets. At times during this repeated process, a register set may have such logic conditions and registers populating it, that it is found to not be reducible. When this happens, the register set is removed. In this manner, the register sets remaining at the end are reducible.

The following detailed description and the accompanying drawings provide additional explanation of the nature and advantages of the present invention.

BRIEF DESCRIPTION OF THE DRAWINGS

The invention will be described with reference to the drawings, in which.

DETAILED DESCRIPTION OF THE INVENTION

An embodiment of the invention can quickly and efficiently optimize a sequential circuit by identifying reducible registers, such as those with "stuck-at" and "duplicate" values. Reducible registers and associated logic can be removed to simplify the sequential circuit. In an embodiment, a two phase analysis identifies reducible registers. The first phase is a screening process, such as random simulation, that efficiently identifies a set of registers that potentially are reducible. The second phase verifies whether registers are in fact reducible for all possible current states and input combinations to the sequential circuit.

I. Screening Phase

Figure 2:
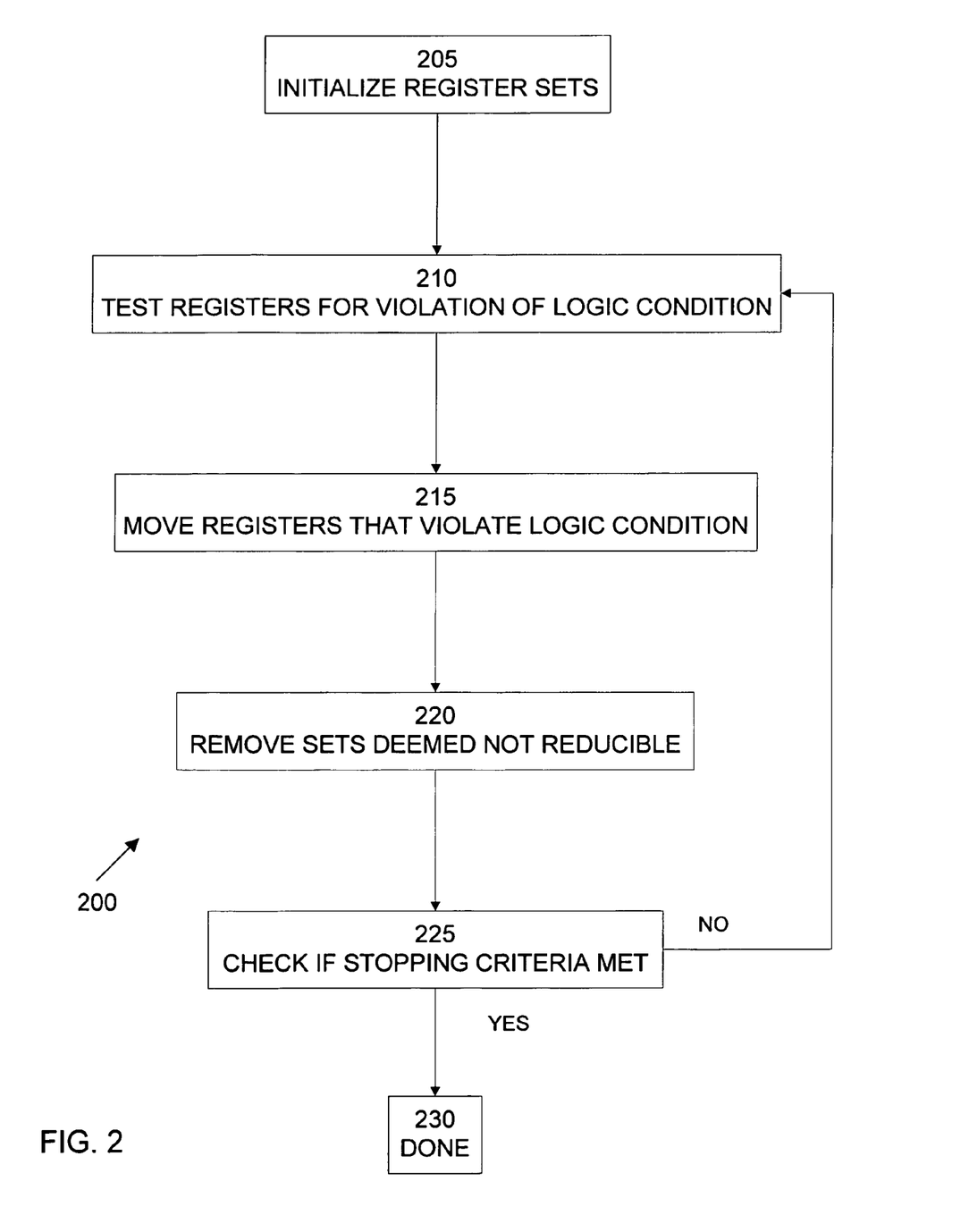
FIG. 2 illustrates a method for identifying potentially reducible registers according to an embodiment of the invention.

FIG. 2 illustrates a method 200 of identifying registers of a sequential circuit that are potentially reducible according to an embodiment of the invention. Step 205 initializes one or more sets R by defining a logic condition for each set and then populating each set with registers that are assumed to satisfy that logic condition. The logic condition of a set R could be based on the register values, or physical relationship or logic relationship within the sequential circuit. Example logic conditions can include registers sharing a common input, the AND of two or more registers giving the value of a third register, or the registers' inputs coming from an OR gate. In further embodiments, a set R could have multiple logic conditions provided these logic conditions are consistent with each other. In additional embodiments, a register could be assigned to more than one register set.

In one embodiment of step 205, a specific register set $R_1$ is a set $R_{sa}$. $R_{sa}$ has the logic condition that all registers in this set have their values remain constant, and thus are "stuck-at" registers. A register in $R_{sa}$ can be present in its inverted or uninverted form. A register that is present in its inverted form is assumed to be stuck-at 0, and a register present in its uninverted form is assumed to be stuck-at 1. For example, the set $R_{sa} = (r_1, \overline{r_2}, r_3)$ contains two registers, $r_1$ and $r_3$, which are stuck-at 1 and one register, $r_2$, which is stuck-at 0.

Any values of the registers may be assumed at step 205. For populating one or more sets R, a registers set would be populated with registers whose assumed values satisfy the logic condition of that set. If $R_{sa}$ is a register set, then it may be initialized with all registers whose values are assumed to be known. In some embodiments, the assumed register values are taken to be values that could occur and would be known during the operation of the sequential circuit. For example, it might be standard practice to have all of the registers initialized to 0 upon power up of the sequential circuit. In this case, all of the registers could be assumed to have the value of 0. Another point, which values could be known during operation, is after a reset signal has been activated, which may assign certain values to registers. Also, after the circuit has gone through some user defined sequence of operations, the register values might be known.

Step 210 tests the logic conditions of the sets to determine if any registers violate the logic conditions of their respective set. In an embodiment, step 210 may provide input values to the combinational logic of the sequential circuit. In one embodiment, the inputs are selected randomly, and in other embodiments the values can be based on certain criteria. For example, ATPG (automatic test pattern generation) techniques can be used to find input values that will activate logic that has not been previously activated. In embodiments where inputs are provided, the inputs combine with the current register values to give new register values. In embodiments where inputs are not provided, the current registers upon simulating of the sequential circuit give new register values. These new register values can be compared to the old register values to see of the registers still satisfy the logic conditions of a set. For example, if a register $r_1$ was in set $R_{sa}$, but its new value is different from its old value then the test shows that this register violates a logic condition of set $R_{sa}$.

In one embodiment, before inputting values to the combinational logic, step 210 changes the values of registers not assigned to any set. In one embodiment, these changed register values are selected randomly, and in other embodiments the values can be based on certain criteria. The ATPG technique may also be used for the changes in the register values. In an additional embodiment, registers assigned to a set may be allowed to change in accordance with the logic conditions of that set. The process of changing the registers allows circuit states to be tested that differ in their initial conditions.

At step 215, a register that violates a condition of a set $R_1$ to which it is assigned is removed from $R_1$. In one embodiment, the removed register may be excluded from further consideration. In another embodiment, step 215 places the register into another set $R_2$. $R_2$ should have logic conditions in which the register has not previously violated. $R_2$ could have been initialized at step 205 and populated at that time, or it could remain empty until step 215. $R_2$ may also be initialized at step 215 or at any previous point in time. In one embodiment, all the registers that violate a logic condition of set $R_1$ are placed into $R_2$. In another embodiment, the violating registers may be placed into different register sets.

In one embodiment, $R_2$ is a set $R_{eq(k)}$, which has a logic condition that all registers of that set are duplicates of register $r_k$. Again, registers may be present within $R_{eq(k)}$ in an inverted or uninverted form. An uninverted register is assumed to carry the same value as $r_k$ and an inverted register is assumed to carry the opposite value. For notational convenience, $R_{eq(k)}$ is assumed to contain $r_k$. Thus, in an embodiment, all registers previously in $R_{sa}$ that change value at the same time are put into $R_{eq(k)}$, where k is the register number for an arbitrary register in the group whose value has changed. In another embodiment where $R_1=R_{eq(n)}$, all registers previously in $R_{eq(n)}$ that do not track a change in value of $r_n$ are placed into $R_2=R_{eq(k)}$.

At step 220, register sets that are deemed not reducible are removed from consideration. Method 200 expends no further effort testing any registers of these removed sets. In one embodiment, registers removed from consideration are added to the registers and inputs that are free to be changed without constraint upon future iterations of method 200. In an embodiment, a set $R_{eq(k)}$ containing only one register would be deemed not reducible because a "duplicate" register must track the changes of another register. If there is only one register in the set, it can no longer be considered a "duplicate" of another register. Accordingly, the register is not reducible with respect to "duplicates."

At step 225, the method 200 checks to see if a stopping criteria is met. The stopping criteria can be problem specific. In one embodiment, the stopping criteria could be a predetermined numerical maximum for the number iterations of method 200 that are done. In another embodiment, the number of registers N that violate a condition could be used for the stopping criteria. If N falls below a threshold value, the method would stop. In another embodiment, N could be used to calculate a percentage of registers violating conditions in comparison to the number all registers, to the number of registers originally populated in a group, to the number of registers in a set, or to compute the percentage of sets that are changing appreciably. If the percentage is below some threshold value then the method would stop. The percentage change could be for one iteration or over a certain number (e.g. 5-6) of iterations.

In summary, method 200 starts by initializing one or more register sets. The initialization defines one or more logic condition for a set and populates the set with registers assumed to satisfy the logic condition. After a set is initialized, a test is done on the set's registers to determine if the registers violate a logic condition of the set. If a register violates a logic condition, it may be removed from consideration as a potentially reducible registers or placed into another set having another logic condition. The process of testing and putting registers in new sets may continue until a stopping criteria is met. At times during this repeated process, a register set may be found to not be reducible. When this happens, the register set is removed and the associated registers are not considered further. In this manner, the registers within register sets remaining at the end have a higher likelihood of being reducible. However, the final subgroup of sets that are potentially reducible as found by this method is not guaranteed to include all registers that can be reduced.

Figure 3:
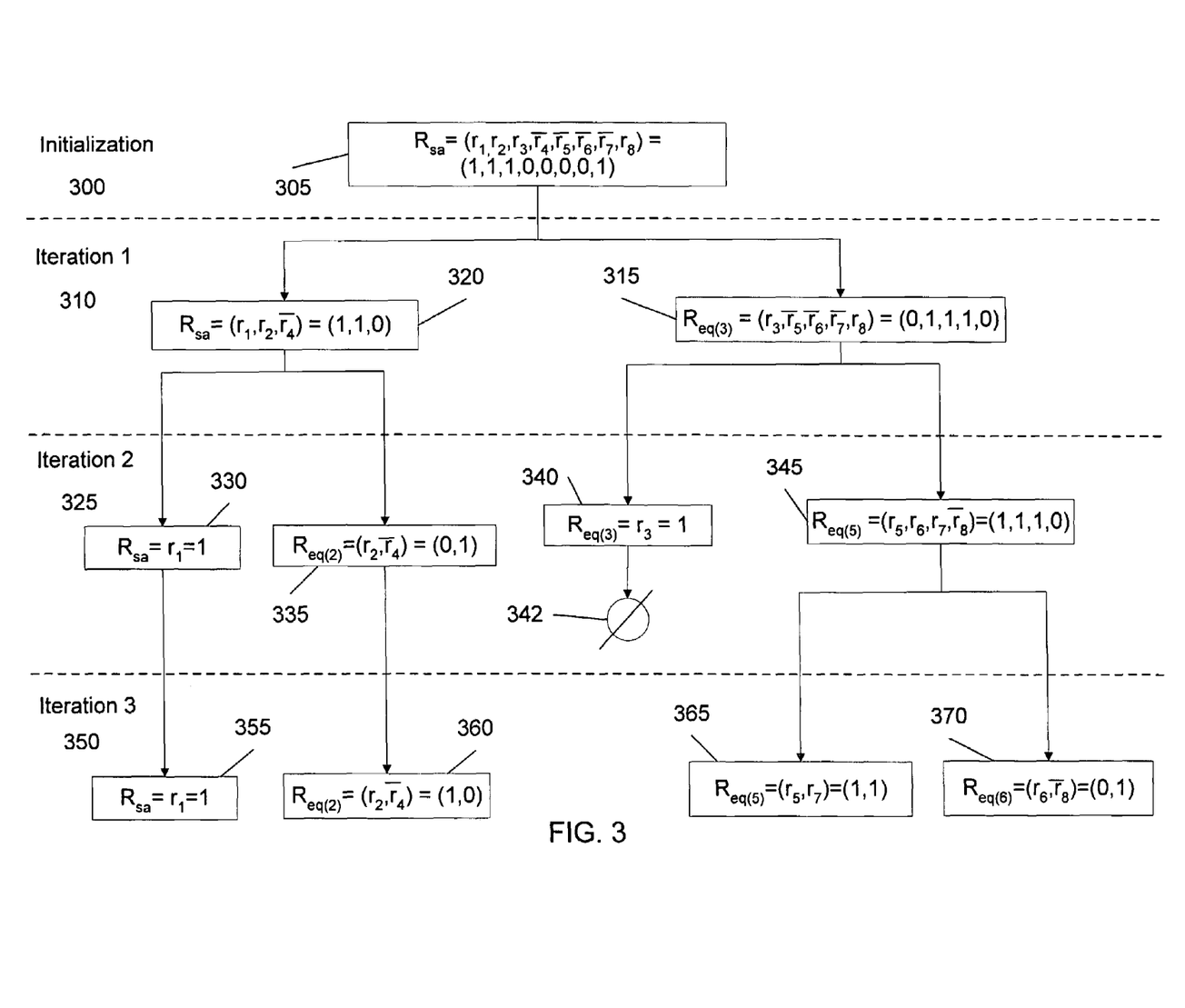
FIG. 3 illustrates an example a the method of identifying potentially reducible registers according to an embodiment of the invention.

FIG. 3 shows different stages of an example application of method 200 according to an embodiment of the invention. The iteration number of the method is signified along the left side of FIG. 3. At the initialization stage 300, set $R_{sa}$ is initialized with registers having known values. In this case, the values of registers $r_1$-$r_8$ are known. The values of these registers are enumerated in the corresponding order.

During the first iteration 310, an example of testing step 210 simulates operation of the sequential circuit with new random values for inputs, giving new register values as output. In this embodiment, registers not in the set $R_{sa}$, or any other set, if applicable, are allowed to change randomly. The new register values and their corresponding sets are shown in iteration one 310. Based on these new values, violating registers are put into new sets as per step 215. For example, registers $r_3$, $r_5$, $r_6$, $r_7$, and $r_8$ changed values. Thus, these registers cannot be part of the set $R_{sa}$ 305, which comprises stuck-at registers. These registers are put into another set which is $R_{eq(3)}$ 315. $R_{eq(3)}$ 315 has the logic condition that the registers are duplicates of each other. Note that the logic condition for $R_{eq(3)}$ has not been violated yet by the registers in $R_{eq(3)}$. Additionally, the registers $r_1$, $r_2$, and $r_4$ stayed the same, and thus have not yet violated the condition of $R_{sa}$. Thus in iteration one 310, $R_{sa}$ 320 contains registers $r_1$, $r_2$, and $r_4$.

In iteration two 325, $r_1$ stays the same and thus remains in $R_{sa}$ 330. However, $r_2$ and $r_4$ have changed values and are placed into $R_{eq(2)}$ 335. Now considering the changes to the registers of set $R_{eq(3)}$ 315, $r_3$ changed value but the other registers did not. Thus, $r_3$ is not a duplicate of the other registers. The other registers $r_5$-$r_8$ are placed into $R_{eq(5)}$ 345. At this point, $r_3$ is the only register in set $R_{eq(3)}$ 340 making it is not a stuck-at register or a duplicate of another register. Thus, $r_3$ is not reducible according to the logic conditions for the sets, $R_{sa}$ and $R_{eq}$, used in the screening method in this embodiment of the invention. As per step 220, $R_{eq(3)}$ is then removed, which is signified by null set 342.

In iteration three 350, $r_1$ does not change and stays in $R_{sa}$ 355. Registers $r_2$ and $r_4$ change values but they do so together and thus both stay in $R_{eq(2)}$ 360. The set $R_{eq(5)}$ has two registers that change and two that don't. Thus $r_5$ and $r_7$, which remain the same, stay in $R_{eq(5)}$ 365. The two registers $r_6$ and $r_8$ that do change are placed into $R_{eq(6)}$ 370.

Thus, at the end of three iterations of this example, there are three sets of potentially reducible registers. Register $r_1$ is potentially a register stuck-at 1. Registers $r_2$ and $r_4$ are potentially duplicates of each other, where $r_4$ is the inverse of $r_2$; registers $r_5$ and $r_7$ are potentially duplicates of each other; and $r_6$ and $r_8$ are potentially duplicates of each other, where $r_8$ is the inverse of $r_6$.

II. Verification Phase

After the screening phase has identified potentially reducible registers that might be reducible, a verification phase determines if the potentially reducible registers are indeed reducible. The verification phase may be of any method, such as Boolean analysis methods including Binary Decision Diagrams (BDDs), Boolean Satisfiability (SAT), and recursive learning methods.

Figure 4:
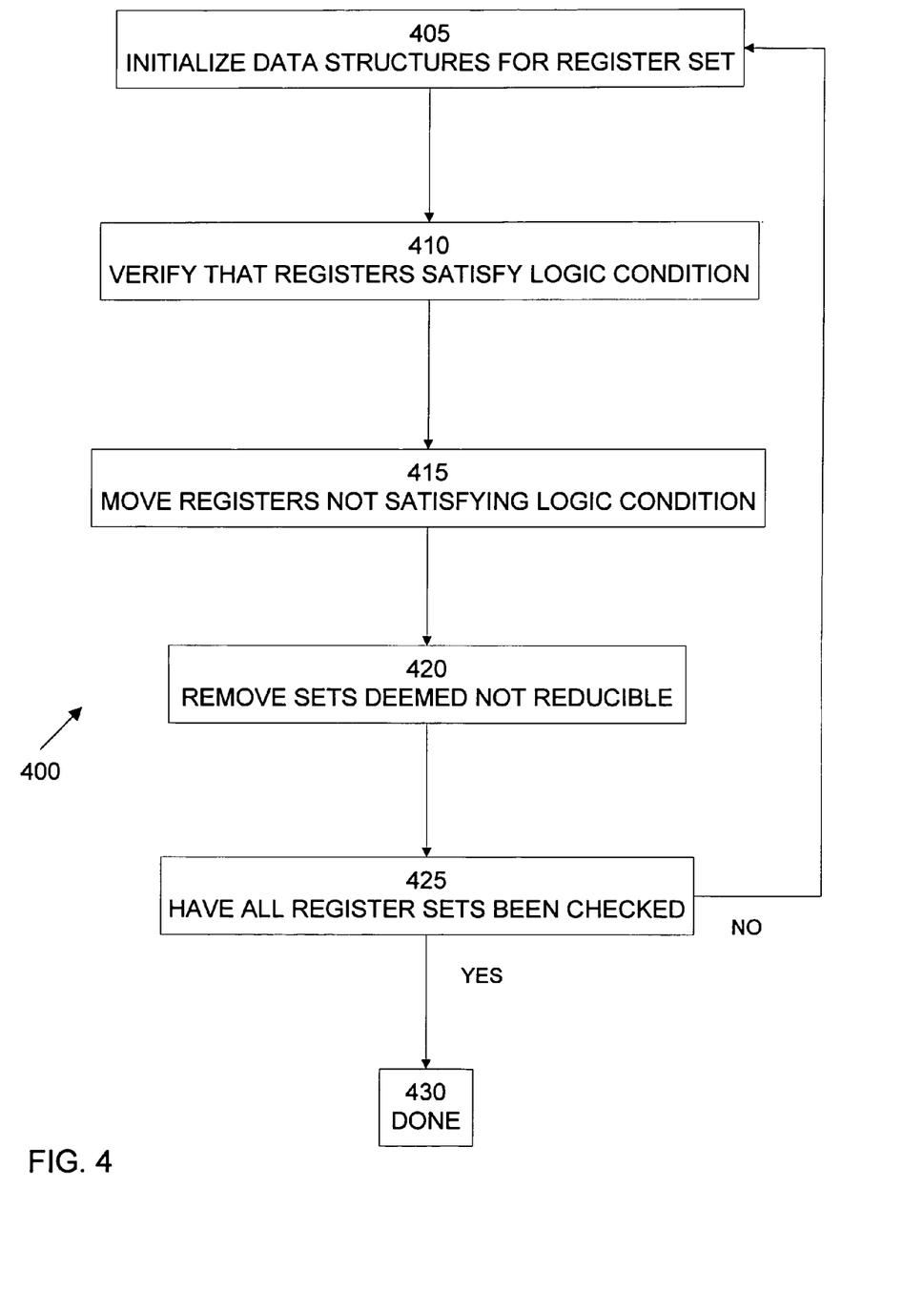
FIG. 4 illustrates a method for verifying reducibility of registers according to an embodiment of the invention.

FIG. 4 illustrates a method 400 of verifying that a set of registers of a sequential circuit are reducible according to an embodiment of the invention. Step 405 initializes data structures for the verification of registers in the current set being analyzed. In some embodiments, Boolean analysis is used for verification. In an embodiment where the Boolean analysis uses SAT, an SAT formula is constructed that relates, for every register that is part of a register set, the next state to the current state and the inputs to the circuit. This can be done by iteratively conjoining the SAT formulas relating each gate's inputs to its outputs. In a specific embodiment where the Boolean analysis uses BDDs, for every register that is part of a register set, a function is constructed that is used to compute the next state given the current state and inputs to the circuit. These embodiments will be discussed in more detail below.

Step 410 verifies if the conditions for a set hold for each register in the set. In some embodiments, a condition of the register set is applied as a constraint on a Boolean analysis method. In an embodiment using SAT, the condition is applied by adding an additional clause to the SAT formula. The register set properties can then be verified by evaluating the satisfiability of the SAT formula. In an embodiment using BDDs, the register set conditions are applied as constraints obtaining modified BDDs. Following the application of constraints, the register set properties can be verified by performing a few tests on the resulting BDDs.

In step 415, a register that does not pass verification of a condition of a set to which it is assigned is removed from that set. In one embodiment, step 415 places the register into another set. In an embodiment where $R_{sa}$ is the current register set being analyzed, all registers previously in $R_{sa}$ that do not pass verification are put into $R_{eq(k)}$ where k is the register number for an arbitrary register that did not pass verification. In another embodiment where $R_{sa}$ is the current register set being analyzed, all registers previously in $R_{eq(n)}$ that do not pass verification of the condition of tracking changes in value in $r_n$ are placed into $R_{eq(k)}$.

At step 420, sets that are deemed not reducible are removed from the sets which are tested. At this point no more effort is expended on testing any registers in this set. In one embodiment, a set $R_{eq(k)}$ containing only one register would be deemed not reducible since it is not tracking the value of another register.

Step 425 checks if all of the registers in existing sets have been verified to conform to the logic conditions of the set to which they belong. If all registers have been checked then the process stop. If all of the registers have not been checked, then method 400 repeats for register sets having unverified registers.

In summary, method 400 cycles through all register sets verifying that the conditions of the set hold for all registers in the set. If a register violates the logic condition of a set then it is removed from the set and possibly placed into another set. Once all of the registers have been verified, then method 400 stops. In one embodiment, register sets may have to be checked twice if new registers are added to the register set. In other embodiments, the method could cycle through each register or each logic condition of a register set.

III. Example Using BDDS and SAT

Figure 5:
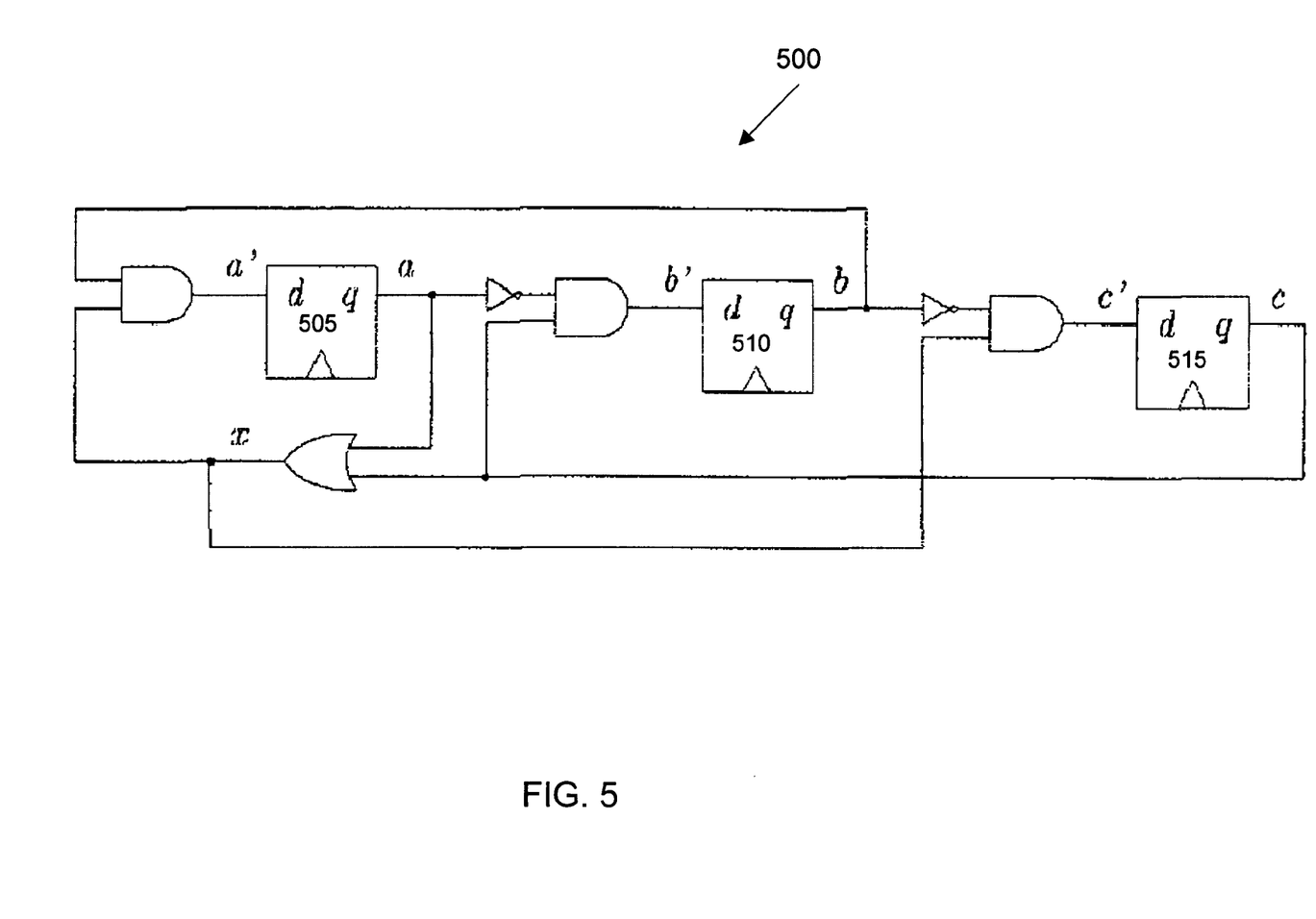
FIG. 5 illustrates an example circuit for applying the method of FIG. 4.

FIG. 5 is an example sequential circuit 500 for illustrating the details of method 400. It consists of three registers a, b, and c, 505, 510, and 515 respectively, which reset or power-up to 0, 0, and 1. The state transitions for the circuit is given in Table 1, listed below, where the present state of the registers is denoted a, b, and c, and the next state of the registers is denoted a', b', and c'. Although it is difficult to determine that register c is a duplicate of register a from the circuit diagram, the state transition table makes this fact obvious. In the present state (PS) column, c always has the opposite value of a. The same is true of the next state (NS) column showing the new register values.

The following example assumes that a single register set, $R_{eq(a)}=\{a, \bar{c}\}$, is produced as a result of screening phase 200, and the contents of $R_{eq(a)}$ are to be verified using Boolean analysis.

TABLE 1

Example State Transition for the Circuit of FIG. 5.

| PS | | | NS | | |
|---|---|---|---|---|---|
| a | b | c | a' | b' | c' |
| 0 | 0 | 1 | 0 | 1 | 1 |
| 0 | 1 | 1 | 1 | 1 | 0 |
| 1 | 1 | 0 | 1 | 0 | 0 |
| 1 | 0 | 0 | 0 | 0 | 1 |

Figure 6A:
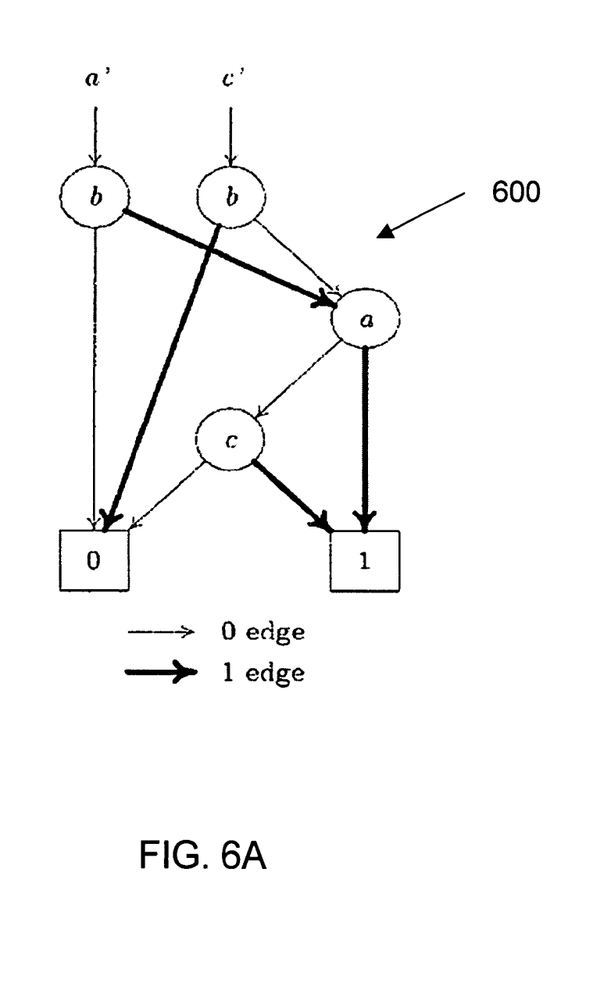
FIGS. 6A and 6B illustrate a data structure at different steps in the method of FIG. 4 according to an embodiment of the invention.
Figure 6B:
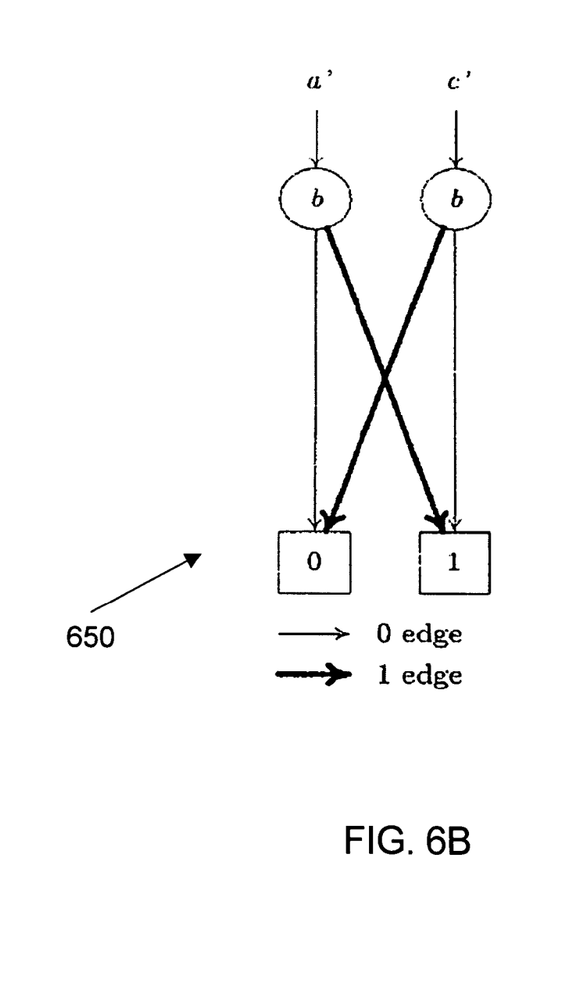

In an embodiment for method 400 using BDDs to simplify the circuit in FIG. 6, the initialization step 405 gives the data structure 600 of FIG. 6A. FIG. 6A illustrates the BDDs for the next values to be loaded into registers a and c. To verify the register set, the conditions are applied as constraints to the data structure 700. The assumed properties for register set $R_{eq(a)}$ constrains register c to take on the opposite value of the value in register a. This produces the BDD data structure 650 illustrated in FIG. 6B.

Following the application of constraints, the register set conditions can be verified by performing a few tests on the resulting BDDs. Any "stuck-at" zero or one logic condition can be verified by checking that the next state function is simply a constant zero or one, respectively. Any "duplicate" logic condition can be verified by checking that the next state function is either the same as or an inversion of the original register. Using the data structure 650 of FIG. 6B, the next state for register c is verified to be an inversion of the next state for register a.

In an embodiment for method 400 using SAT to simplify the example circuit 500 in FIG. 5, the initialization step 405 gives the data structure of equation 1 of Table 2. As part of verifying the register set in step 410, the register set conditions are applied as constraints to the SAT formula constructed in step 405. These constraints are added as additional clauses in the SAT formula. The assumed properties for register set $R_{eq(a)}$ constrains register c to take on the opposite value of the value in register a. This can be added to the SAT formula as two extra clauses shown in equation (2) of Table 2.

Following the application of constraints, any register set condition can be verified by adding clauses that specify the opposite of the property being tested for. If the SAT solver returns with UNSAT then the property is true; otherwise it is false. Returning to our example, we can test that c is a duplicate of a by adding the two clauses in equation (3) of Table 2 to the SAT formula.

TABLE 2

SAT formula and related constraint clauses for the Circuit of FIG. 6.

| | |
|---|---|
| $(b + \bar{a}')(x + \bar{a}')(\bar{b} + \bar{x} + a')(\bar{a} + \bar{b}')(c + \bar{b}')(a + \bar{c} + b')$ | (1) |
| $(\bar{b} + \bar{c}')(x + \bar{c}')(b + \bar{x} + c')(\bar{a} + x)(\bar{c} + x)(a + c + \bar{x}')$ | |
| $(c + a)(\bar{c}' + \bar{a}')$ | (2) |
| $(c' + \bar{a}')(\bar{c}' + a')$ | (3) |

In both examples using BDDs and SAT, an initial data structure is created. The logic condition of a set constrains the data structure, which in this examples is that register c is a duplicate of register a. Given the constraints, tests on the data structures verify whether the constraint is satisfied.

IV. General Application of Method to Field

Figure 7:
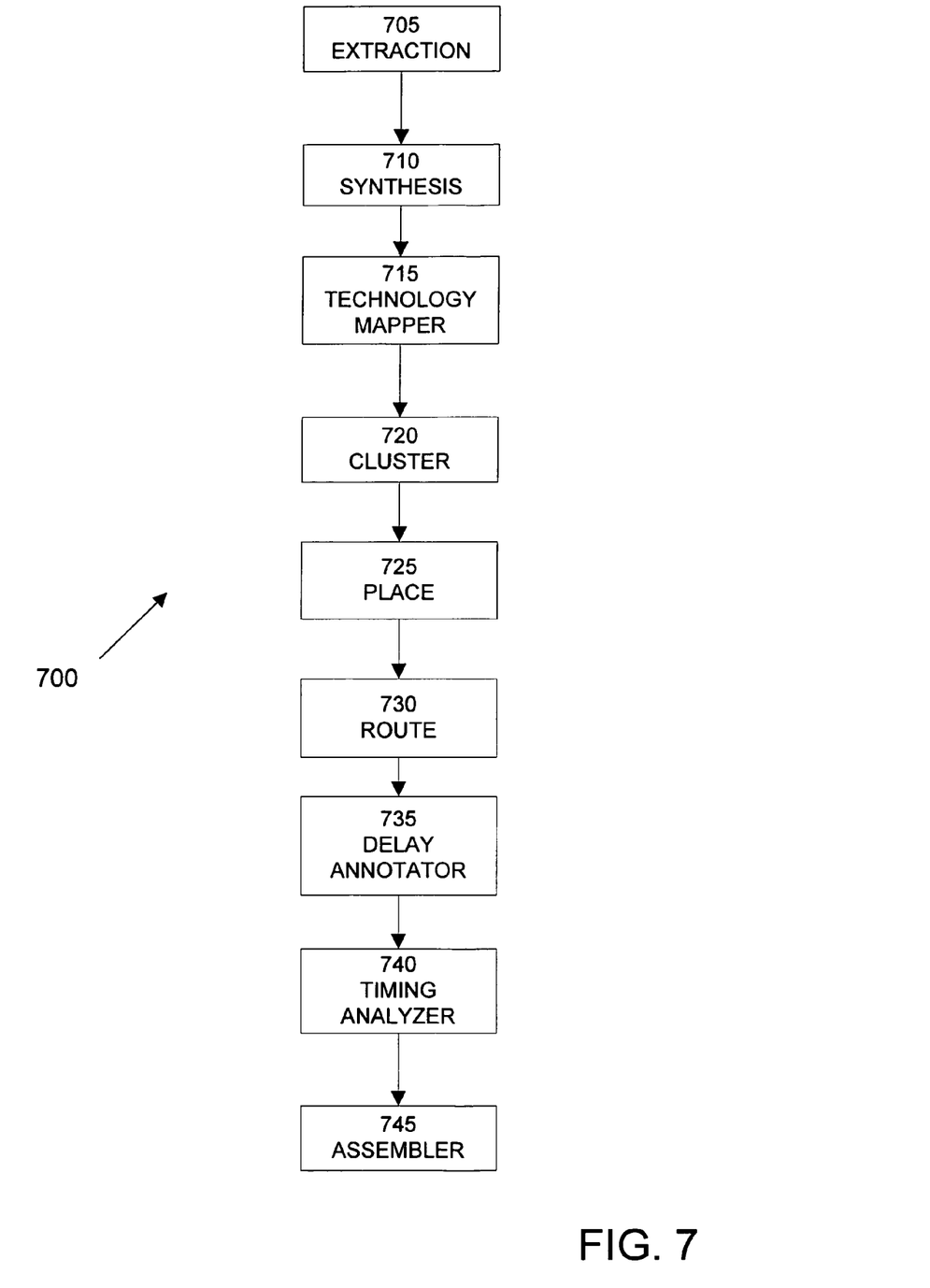
FIG. 7 illustrates a compilation process suitable for implementing an embodiment of the invention.

FIG. 7 illustrates a compilation process 700 suitable for implementing an embodiment of the invention. The compilation process 700 converts a user design into a programmable device configuration adapted to configure a programmable device to implement the user design. The extraction phase 705 converts a description of the user design, expressed for example in a hardware description language, into a register transfer layer description.

Synthesis phase 710 converts the register transfer layer description of the user design into a set of logic gates. Technology mapping phase 715 subdivides the set of logic gates into a set of atoms, which are groups of logic gates matching the capabilities of the logic cells or other functional blocks of the programmable device. A given user design may be converted into any number of different sets of atoms, depending upon the underlying hardware of the programmable device used to implement the user design.

Following the technology mapping phase 715, the cluster phase 720 groups related atoms together into clusters. The place phase 725 assigns clusters of atoms to locations on the programmable device. The route phase 730 determines the configuration of the configurable switching circuit of the programmable device used to connect the atoms implementing the user design.

The delay annotator phase 735 determines the signal delays for the set of atoms and their associated connections in the configurable switching circuit using a timing model of the programmable device. The timing analysis phase 740 determines the maximum operating speed of the programmable device when implementing the user design, for example by determining the portions of the user design have the largest signal delay.

The assembler phase 745 generates a set of configuration information specifying the configuration of the programmable device implementing the user design, including the configuration of each of the logic cells used to implement the user design and the configuration of the configurable switching circuit used to connect the logic cells. The assembler phase 745 can write the configuration information to a configuration file, which can then be used to configure one or more programmable devices to implement instances of the user design.

Figure 8:
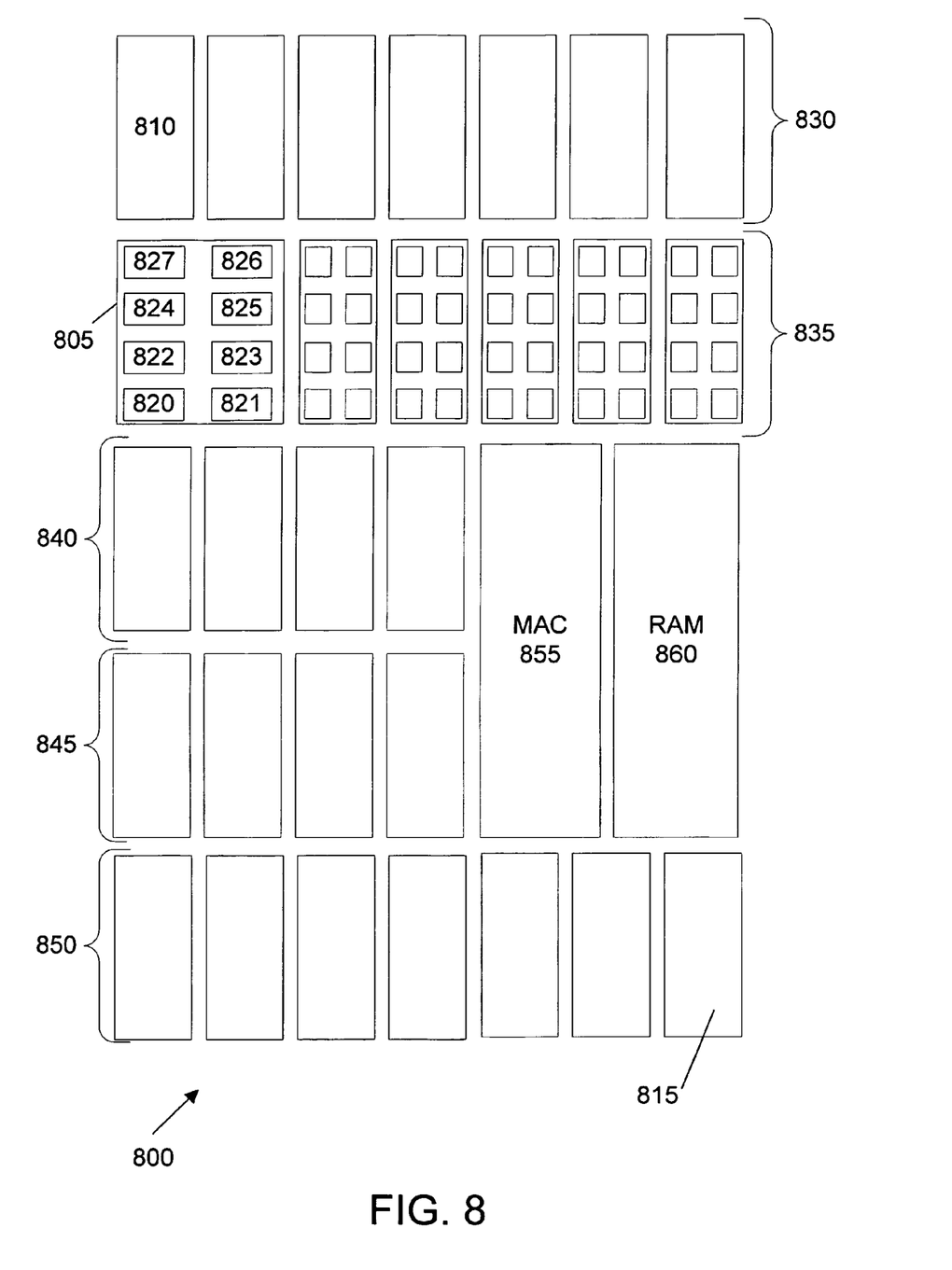
FIG. 8 illustrates a programmable device suitable for implementing a user design processed with an embodiment of the invention.

FIG. 8 illustrates a programmable device 800 suitable for implementing a user design processed with an embodiment of the invention. Programmable device 800 includes a number of logic array blocks (LABs), such as LABs 805, 810, 815. Each LAB includes a number of programmable logic cells using logic gates and/or look-up tables to perform a logic operation. LAB 805 illustrates in detail logic cells 820, 821, 822, 823, 824, 825, 826, and 827. Logic cells are omitted from other LABs in FIG. 8 for clarity. The LABs of device 800 are arranged into rows 830, 835, 840, 845, and 850. In an embodiment, the arrangement of logic cells within a LAB and of LABs within rows provides a hierarchical system of configurable connections, in which connections between logic cells within a LAB, between cells in different LABs in the same row, and between cells in LABs in different rows require progressively more resources and operate less efficiently.

In addition to logic cells arranged in LABs, programmable device 800 also includes specialized functional blocks, such as multiply and accumulate block (MAC) 855 and random access memory block (RAM) 860. For clarity, the portion of the programmable device 800 shown in FIG. 8 only includes a small number of logic cells, LABs, and functional blocks. Typical programmable devices will include thousands or tens of thousands of these elements.

Figure 9:
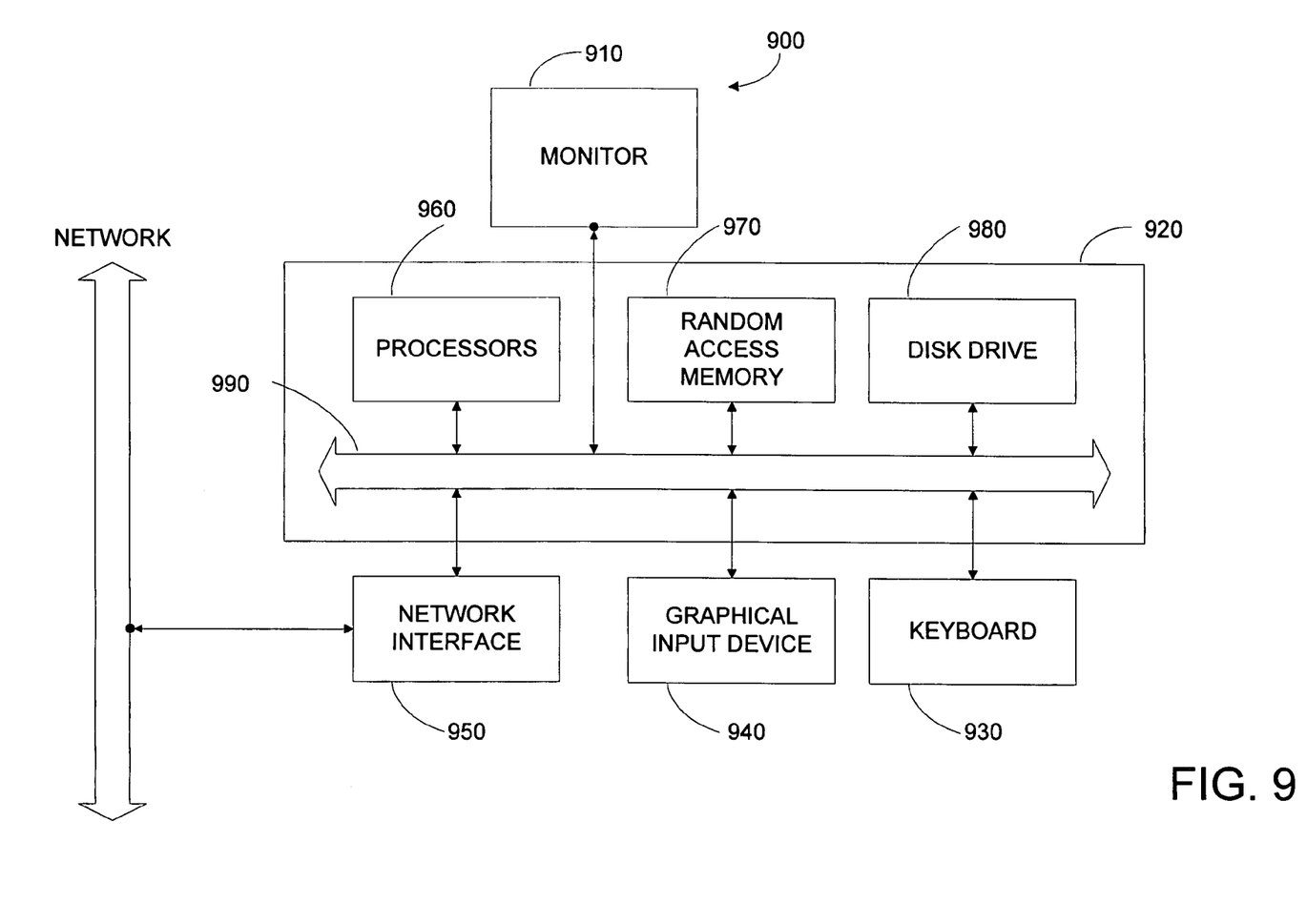
FIG. 9 illustrates a computer system suitable for implementing an embodiment of the invention.

FIG. 9 illustrates a computer system 900 suitable for implementing an embodiment of the invention. Computer system 900 typically includes a monitor 910, computer 920, a keyboard 930, a user input device 940, and a network interface 950. User input device 940 includes a computer mouse, a trackball, a track pad, graphics tablet, touch screen, and/or other wired or wireless input devices that allow a user to create or select graphics, objects, icons, and/or text appearing on the monitor 910. Embodiments of network interface 950 typically provides wired or wireless communication with an electronic communications network, such as a local area network, a wide area network, for example the Internet, and/or virtual networks, for example a virtual private network (VPN).

Computer 920 typically includes components such as one or more general purpose processors 960, and memory storage devices, such as a random access memory (RAM) 970, disk drives 980, and system bus 990 interconnecting the above components. RAM 970 and disk drive 980 are examples of tangible media for storage of data, audio/video files, computer programs, applet interpreters or compilers, virtual machines, and embodiments of the herein described invention. Further embodiments of computer 1200 can include specialized input, output, and communications subsystems for configuring, operating, testing, and communicating with programmable devices. Other types of tangible media include floppy disks; removable hard disks; optical storage media such as DVD-ROM, CD-ROM, and bar codes; non-volatile memory devices such as flash memories; read-only-memories (ROMS); battery-backed volatile memories; and networked storage devices.

Further embodiments can be envisioned to one of ordinary skill in the art after reading the attached documents. For example, although the invention has been discussed with reference to programmable devices, it is equally applicable to logic minimization applications used to design any type of digital device, such as standard or structured ASICs, gate arrays, and general digital logic devices. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for optimizing a sequential circuit, the method comprising:
    defining a set $R_1$ having a first logic condition;
    populating the set $R_1$ with registers assumed to satisfy the first logic condition;
    testing a plurality of registers in the set $R_1$ for a violation of the first logic condition of the set $R_1$;
    removing, from the set $R_1$, at least one register violating the first logic condition of the set $R_1$; and
    verifying whether the registers remaining in the set $R_1$ satisfy the first logic condition.

2. The method of claim 1, wherein the first logic condition is a stuck-at condition.

3. The method of claim 1, further comprising:
    defining a set $R_2$ of registers having a second logic condition; and
    placing the at least one register violating the first logic condition of the set $R_1$ into the set $R_2$.

4. The method of claim 3, wherein the second logic condition is a duplicate condition.

5. The method of claim 3, further comprising:
repeating testing and removing for at least a portion of the plurality of registers that remain in the set $R_1$;
testing a plurality of registers in the set $R_2$ for a violation of the second logic condition of the set $R_2$; and
removing, from the set $R_2$, at least one register violating the second logic condition of the set $R_2$.

6. The method of claim 5, further comprising:
removing the set $R_2$ if the set $R_2$ does not include any reducible registers.

7. The method of claim 5, further comprising:
repeating testing a plurality of registers of the sets $R_1$ and $R_2$ for a predetermined number of iterations.

8. The method of claim 5, further comprising:
repeating testing a plurality of registers and removing of at least one register violating a logic condition of the sets $R_1$ and $R_2$ until a number of registers violating a logic condition of a set is less than a threshold value.

9. The method of claim 1, wherein the testing comprises:
determining a current state of the sequential circuit, wherein the state includes values for a plurality of registers of the set $R_1$;
determining a next state of the sequential circuit, wherein the next state includes second values for the plurality of registers of the set $R_1$; and
comparing the next state to the current state to determine registers violating the first logic condition of set $R_1$.

10. The method of claim 9, wherein the determining a next state comprises:
simulating the sequential circuit using register values of the current state and input values.

11. The method of claim 10, wherein the simulating comprises randomly changing the input values and register values of registers not belonging to the set $R_1$.

12. The method of claim 1, wherein the verifying comprises using Boolean analysis.

13. The method of claim 12, further comprising:
applying the first logic condition as a constraint on the Boolean analysis.

14. The method of claim 1, further comprising:
removing a first register from the set $R_1$ if the verifying determines that the first register does not satisfy the first logic condition.

15. The method of claim 14, further comprising:
defining a set $R_2$ of registers having a second logic condition; and
placing the first register that does not satisfy the first logic condition of the set $R_1$ into the set $R_2$.

16. An information storage medium comprising a plurality of instructions adapted to direct an information processing device to perform an operation comprising:
defining a set $R_1$ having a first logic condition;
populating the set $R_1$ with registers assumed to satisfy the first logic condition;
testing a plurality of registers in the set $R_1$ for a violation of the first logic condition of the set $R_1$;
removing, from the set $R_1$, at least one register violating the first logic condition of the set $R_1$; and
verifying whether the registers remaining in the set $R_1$ satisfy the first logic condition.

17. The information storage medium of claim 16, wherein the first logic condition is a stuck-at condition.

18. The information storage medium of claim 16, further comprising:
defining a set $R_2$ of registers having a second logic condition; and
placing the at least one register violating the first logic condition of the set $R_1$ into the set $R_2$.

19. The information storage medium of claim 18, wherein the second logic condition is a duplicate condition.

20. The information storage medium of claim 18, further comprising:
repeating testing and removing for at least a portion of the plurality of registers that remain in the set $R_1$;
testing a plurality of registers in the set $R_2$ for a violation of the second logic condition of the set $R_2$; and
removing, from the set $R_2$, at least one register violating the second logic condition of the set $R_2$.

21. The information storage medium of claim 20, further comprising:
removing the set $R_2$ if the registers in the set $R_2$ are not reducible.

22. The information storage medium of claim 20, further comprising:
repeating testing a plurality of registers of the sets $R_1$ and $R_2$ for a predetermined number of iterations.

23. The information storage medium of claim 20, further comprising:
repeating testing a plurality of registers and removing of at least one register violating a logic condition of the sets $R_1$ and $R_2$ until a number of registers violating a logic condition of a set is less than a threshold value.

24. The information storage medium of claim 16, wherein the testing comprises:
determining a current state of the sequential circuit, wherein the state includes values for a plurality of registers of the set $R_1$;
determining a next state of the sequential circuit, wherein the next state includes second values for the plurality of registers of the set $R_1$; and
comparing the next state to the current state to determine registers violating the first logic condition of set $R_1$.

25. The information storage medium of claim 24, wherein the determining a next state comprises:
simulating the sequential circuit using register values of the current state and input values.

26. The information storage medium of claim 25, wherein the simulating comprises randomly changing the input values and register values of registers not belonging to the set $R_1$.

27. The information storage medium of claim 16, wherein the verifying comprises using Boolean analysis.

28. The information storage medium of claim 27, further comprising:
applying the first logic condition as a constraint on the Boolean analysis.

29. The information storage medium of claim 16, further comprising:
removing a first register from the set $R_1$ if the verifying determines that the first register does not satisfy the first logic condition.

30. The information storage medium of claim 29, further comprising:
defining a set $R_2$ of registers having a second logic condition; and
placing the first register that does not satisfy the first logic condition of the set $R_1$ into the set $R_2$.

* * * * *